(12) United States Patent
Kasono (10) Patent No.: US 6,292,442 B1
(45) Date of Patent: Sep. 18, 2001

(54) OPTICAL HEAD

(75) Inventor: Osamu Kasono, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/262,593

(22) Filed: Mar. 5, 1999

(30) Foreign Application Priority Data

Mar. 12, 1998 (JP) .................................................. 10-080304

(51) Int. Cl.[7] ....................................................... G11B 7/12
(52) U.S. Cl. ..................................... 369/44.23; 369/44.14; 369/112.23
(58) Field of Search ............................... 369/44.23, 44.14, 369/44.25, 44.12, 44.28, 44.32, 44.34, 112, 110, 109, 112.01, 112.23, 112.24, 112.26

(56) References Cited

U.S. PATENT DOCUMENTS

| | | | |
|---|---|---|---|
| 5,764,613 | * | 6/1998 | Yamamoto et al. ........... 369/44.23 X |
| 6,005,834 | * | 12/1999 | Maeda et al. ................. 369/44.23 X |
| 6,055,222 | * | 4/2000 | Knight .......................... 369/44.23 X |
| 6,061,322 | * | 5/2000 | Jain et al. ..................... 369/44.23 X |

* cited by examiner

*Primary Examiner*—Muhammad Edun
(74) *Attorney, Agent, or Firm*—Arent Fox Kintner Plotkin & Kahn, PLLC

(57) ABSTRACT

An optical head apparatus includes an object lens, a solid immersion lens, drive unit, and control unit. The object lens converges light, which is radiated on a recording surface of a recording media. The solid immersion lens further converges the light having been converged by the object lens. The drive unit drives the object lens along an optical axis. The control unit controls the drive unit so that the distance between the object lens and the solid immersion lens along the optical axis is kept constant, according to reflected light from the solid immersion lens.

7 Claims, 7 Drawing Sheets

OPTICAL HEAD

BACKGROUND OF THE INVENTION

The present invention relates to an optical head apparatus for optical discs, and particularly to an optical head used for producing master optical discs.

In order to increase recording density of an optical disc, laser light having a short wavelength and/or an object lens with a large numerical aperture must be used.

However, it is not easy to develop a semiconductor laser which emits laser light having a short wavelength. While enlarging the diameter of the object lens broadens the numerical aperture of the object lens, the optical head itself consequently becomes large in size.

Hence, recording information on an optical disc using a Solid Immersion Lens (referred to as SIL, hereinafter) is proposed by Mr. S. M. Mansfield et. al. in "High-numerical-aperture lens system for optical storage" (OPTICS LETTERS/Vol. 18, No. 4 305–307/Feb. 15, 1993).

This is a method wherein laser light gathered by the object lens is radiated on the SIL, which further converges the laser light. A minute spot can be formed by using the SIL.

In order to form a minute spot by the SIL, it is necessary to converge the laser light onto the bottom surface of the SIL. Therefore, the laser light must be led into the SIL after having been sufficiently gathered by the object lens. In other words, the object lens must be controlled so that it can be always optimally positioned relative to the SIL.

In order to perform the above-mentioned control, it is necessary to generate a focus error signal according to the reflected light from the SIL. However, the reflected light detected by a detector includes those reflected from the spherical surface of the SIL, the bottom surface of the SIL, and the master optical disc or the like.

Hence, the output derived from the light received by the detector includes much noise and is not acceptable to be used directly as the focus error signal for controlling the object lens to be optimally positioned.

SUMMARY OF THE INVENTION

Considering the above-mentioned problems, it is an object of the present invention to provide an optical head using an SIL.

To be concrete, it is an object of the preset invention to provide an optical head which can adjust the distance between the object lens and the SIL to be constant, which stabilizes formation of the minute spot.

It is another object of the present invention to provide an optical head which can effectively select a specified reflected light from the SIL to be detected, for adjusting the distance between the object lens and the SIL to be constant.

To attain the above object, the present invention provides an optical head comprising an object lens for converging light which is radiated on a recording surface of a recording media, a solid immersion lens for further converging the light which has been converged by the object lens, drive means for driving the object lens along an optical axis thereof, and control means for controlling the drive means so that the distance between the object lens and the solid immersion lens along the optical axis is kept constant, according to reflected light from the solid immersion lens.

Furthermore, the present invention provides an optical head as composed above, in which further the solid immersion lens is mounted on a floating slider, and the distance between the recording media and the solid immersion lens is kept constant.

The present invention still further provides an optical head as composed above, further comprising means for separating and receiving the reflected light from the spherical surface of the solid immersion lens, and in which the control means controls the drive means according to the output derived from the light received by the means for separating and receiving the reflected light.

In addition, the present invention provides an optical head as composed above, further comprising a reflective membrane or a reflective layer disposed on the surface of the solid immersion lens for reflecting the light which has been converged by the object lens.

BRIEF DESCRIPTION OF THE DRAWINGS

The present invention, together with objects and advantages thereof, may best be understood by reference to the following description of the presently preferred embodiments together with the accompanying drawings in which.

DETALED DESCRIPTION OF THE PREFERRED EMBODIMENTS

Now a first embodiment according to the present invention will be described.

Figure 1:
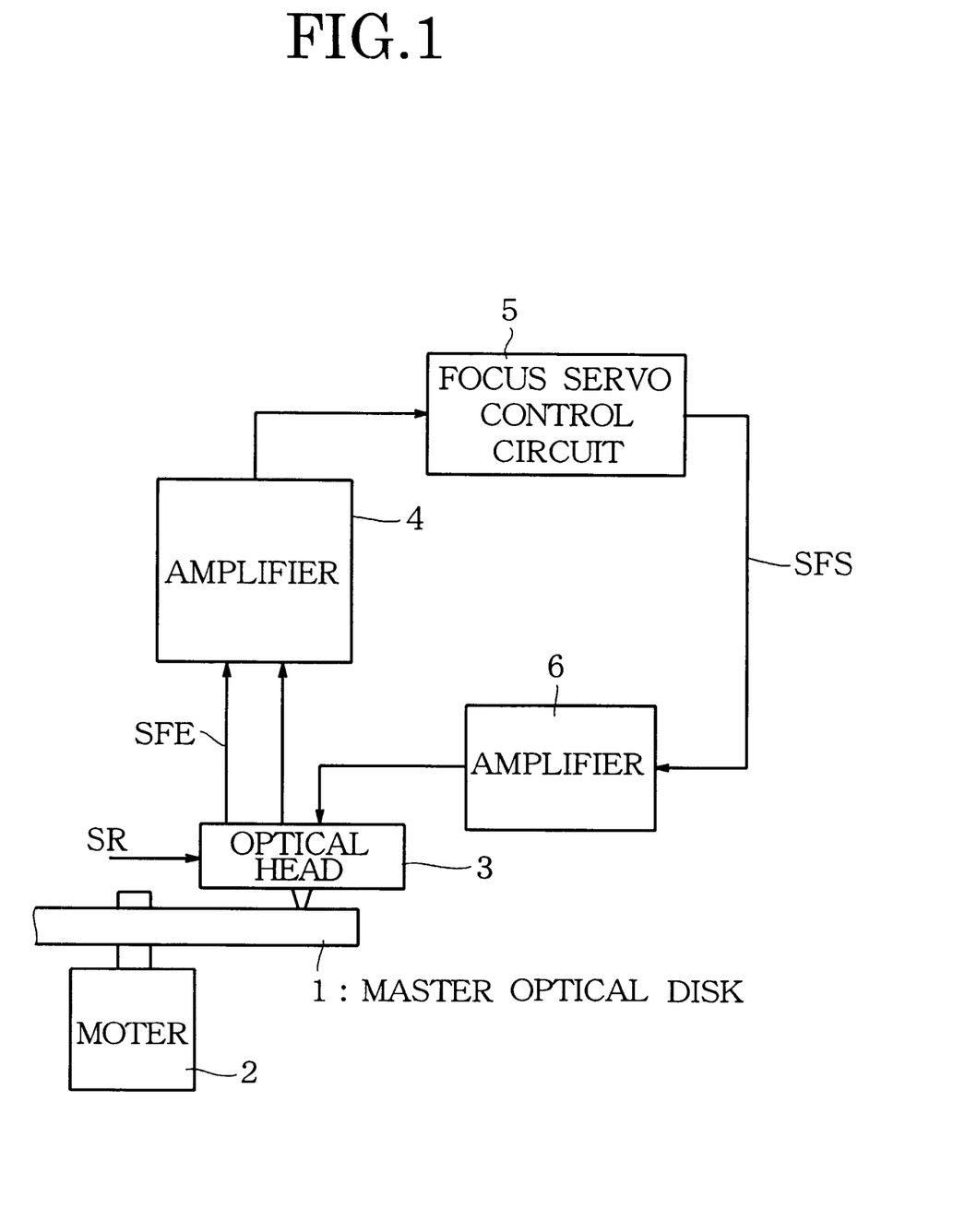
FIG. 1 is a diagram showing a composition of a master optical disc recording apparatus including an optical head according to a first embodiment of the present invention.

FIG. 1 shows a composition of a master optical disc recording apparatus using an optical head according to a first embodiment of the present invention. In the figure, the master optical disc recording apparatus includes a motor 2 for rotating a master optical disc 1 having a glass substrate and photoresist coated thereon, an optical head 3 for radiating recording light onto the maser optical disc 1, an amplifier 4 for amplifying output derived from received light in the optical head 3, a focus servo control circuit 5 for focus control of an object lens, and an amplifier 6 for amplifying output from the focus servo control circuit 5.

A recording signal SR which is to be recorded on the optical disc is externally supplied to the optical head 3. A focus error signal SFE outputted from the optical head 3 is supplied to the focus servo control circuit 5 via the amplifier 4. The focus servo control circuit 5 outputs a focus servo signal SFS for driving an object lens actuator of the optical head 3 according to the focus error signal SFE. The focus servo signal SFS is supplied to the optical head 3 via the amplifier 6. Besides, focus servo control of the object lens is performed according to known method.

Figure 2:
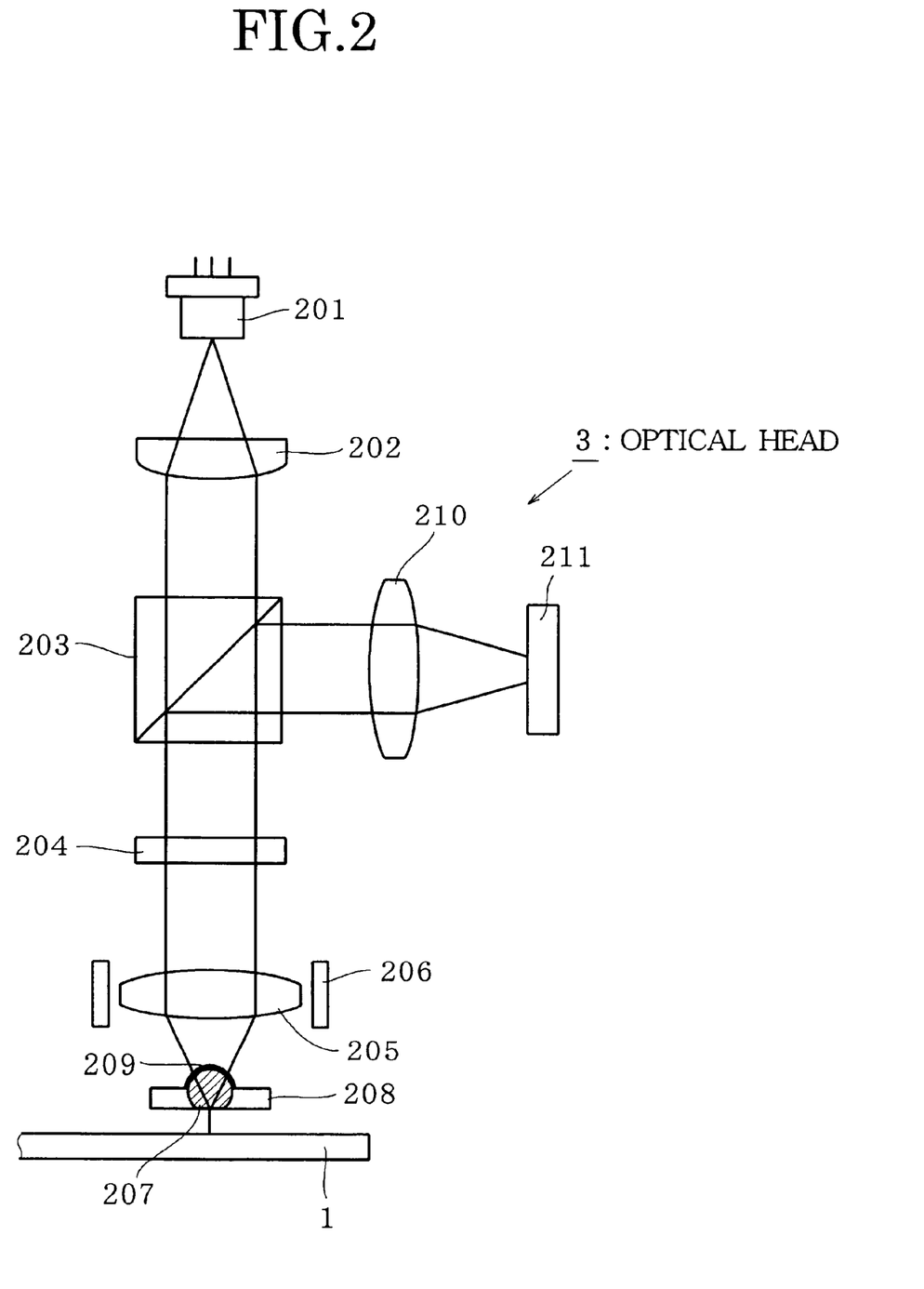
FIG. 2 is a diagram showing an exemplary composition of the optical head according to the first embodiment.

The composition of the optical head will be described next. FIG. 2 shows an exemplary composition of the optical head 3. The optical head 3 includes a laser light source 201 such as semiconductor laser or the like, a collimator lens 202 for aligning the light emitted from the laser light source 201 into parallel light, a polarized light beam splitter 203, a quarter wave length board 204, an object lens 205, an actuator 206 for driving the object lens 205 as a whole, an SIL 207 for further converging the light which has been gathered by the object lens 205, and a floating slider 208 for holding the SIL. Here, reference numeral 209 denotes a reflective membrane disposed on the spherical surface of the SIL 207. Reference numerals 210 and 211 denote a light gathering lens and a detector, respectively.

The floating slider 208, on which the SIL 207 is mounted and held, arranges the distance between the master optical disc 1 and the SIL 207 to be about 50 to 100 nm at the time of recording. If a negative pressure slider is used as the floating slider 208, the distance between the master optical disc 1 and the SIL 207 can be kept constant regardless of the linear velocity. Negative sliders are described in detail in Nikkei Electronics, No. 528 (published May 27, 1991), pp. 110 to 111.

The object lens 205 is focus controlled so as to gather the laser light from the laser light source 201 onto the spherical surface of the SIL 207. The light converged by the object lens 205 is further converged by the SIL 207 and radiated onto the master optical disc 1.

Figure 3:
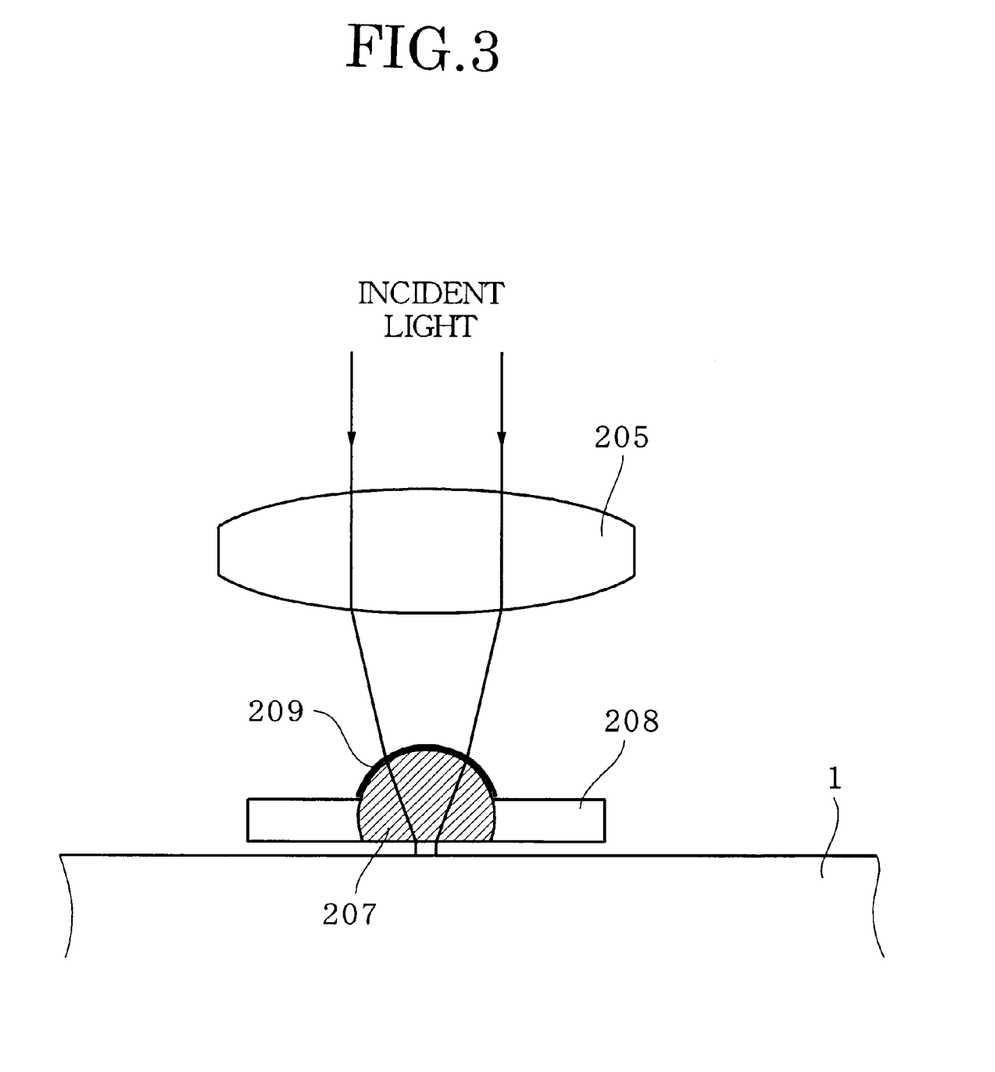
FIG. 3 is an enlarged cross-sectional view around the SIL of the optical head according to the first embodiment.

FIG. 3 is an enlarged cross-sectional view around the SIL 207. On the spherical surface of the SIL 207 is disposed the reflective membrane 209 for reflecting a portion of the laser light gathered by the object lens 205. The reflective membrane 209 is formed by coating chrome membrane or dielectric multi-layer membrane on the spherical surface of the SIL 207. This reflective membrane 209 may be displaced by a reflective layer which has a plurality of dielectric construction. The reflectance of the reflective membrane 209 is set, by adjusting membrane thickness and layer structure, so that sufficient amount of light for performing focus control can be obtained.

Figure 4:
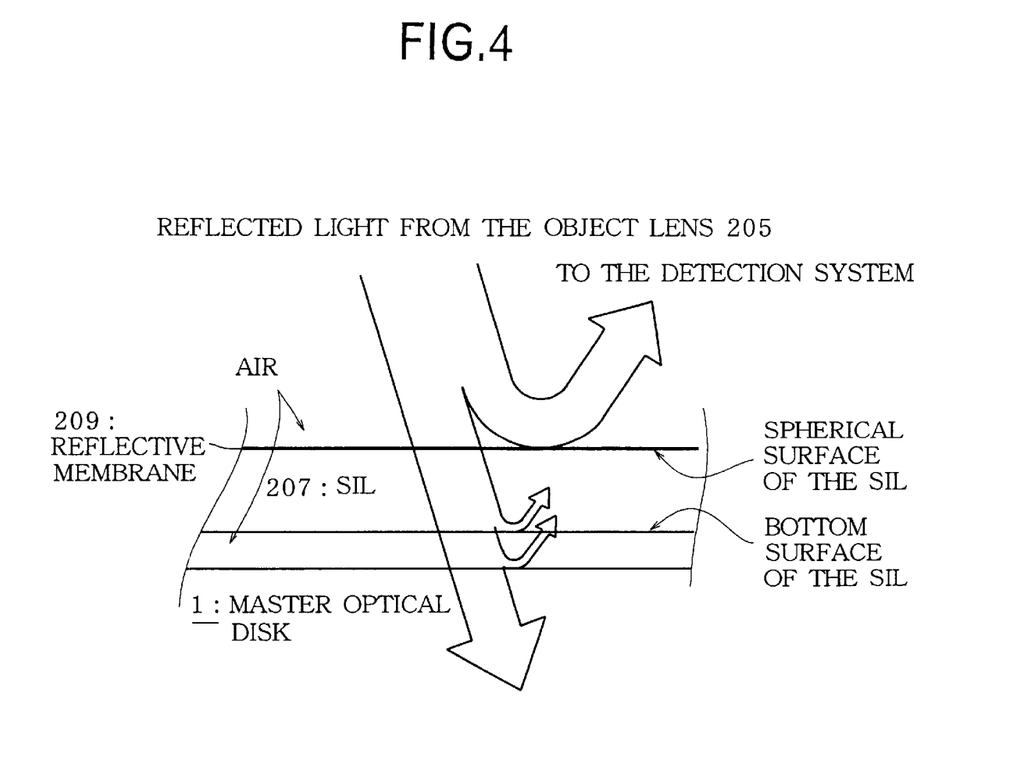
FIG. 4 is a schematic diagram showing a state of reflection of the laser light according to the first embodiment.

FIG.4 is a schematic diagram showing a state in which the laser light gathered by the object lens 205 is reflected. A portion of the laser light gathered by the object lens 205 is reflected by the reflective membrane 209 disposed on the spherical surface of the SIL 207. Most of the laser light which passed through the reflective membrane 209 of the SIL 207 is radiated onto the master optical disc 1, only a minimal portion being reflected at the bottom surface of the SIL 207, and exposes the photoresist. A portion of the laser light is also reflected at the surface of the master optical disc 1.

The reflected light thus obtained passes through the object lens 205 and the quarter wave length board 204 again as shown in FIG. 2, and then the light path is changed by the polarized light beam splitter 203. Then the reflected light is converged onto the detector 211 via the light gathering lens 210. The output of the detector 211 is outputted as the focus error signal SFE to the above-mentioned amplifier 4.

Hence the detector 211 receives the reflected light from the spherical surface of the SIL 207, the bottom surface of the SIL 207, and the master optical disc 1. However, the amount of the reflected light from the spherical surface of the SIL 207 being sufficiently larger than the amount of the other two types of reflected light due to the reflective membrane 209, the amount of the light received by the detector 211 is made up, for the most part, by the reflected light from the spherical surface of the SIL 207.

Therefore, it becomes possible to control the object lens 205 to be positioned so that the laser light is gathered onto the spherical surface of the SIL 207, because the focus error signal SFE is based on the reflected light from the spherical surface of the SIL 207.

Now a second embodiment according to the present invention will be described.

The master optical disc recording apparatus according to the second embodiment is composed using, in place of the optical head 3, an optical head 7 in which the detector 211 can receive only the reflected light from the spherical surface of the SIL 207 in the master optical disc recording apparatus (see FIG. 1) of the above-mentioned first embodiment. Since the components except for the optical head 7 are the same as those in the first embodiment, explanation about them is omitted.

Figure 5:
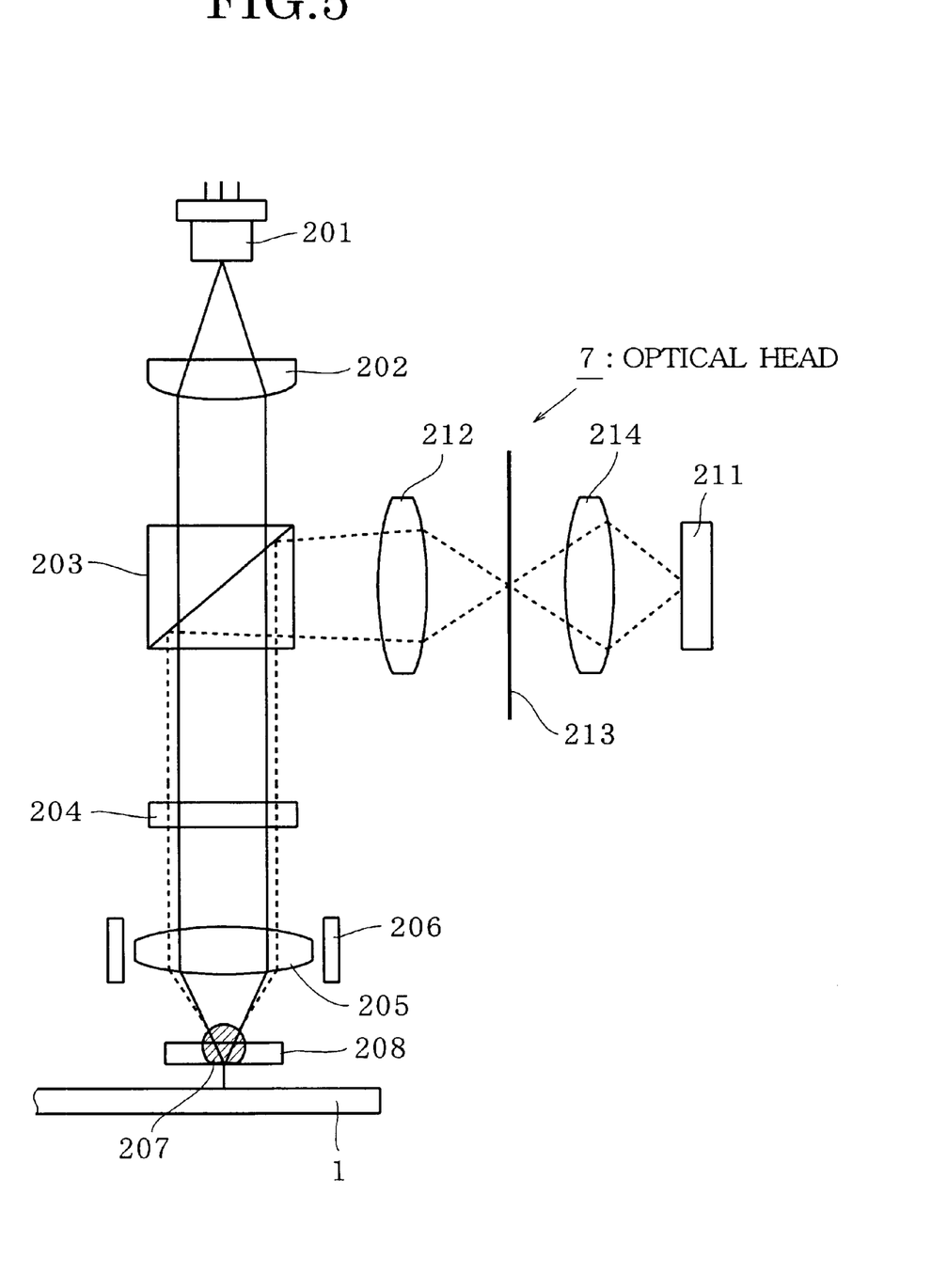
FIG. 5 is a diagram showing an exemplary composition of an optical head according to a second embodiment of the present invention.

FIG. 5 shows an exemplary composition of the optical head 7. In FIG. 5, the elements corresponding to those in the above-mentioned composition of FIG. 2 are designated with common reference numerals. Unit 1 is the master optical disc and the optical head 7 is composed of a laser light source 201, a collimator lens 202 for aligning the light emitted from the laser light source 201 into parallel light, a polarized light beam splitter 203, a quarter wave length board 204, an object lens 205, an actuator 206 for driving the object lens 205 as a whole, an SIL 207 for further converging the light which has been gathered by the object lens 205, and a floating slider 208 for holding the SIL. Additionally, a separation lens 212, a pinhole 213, and a light gathering lens 214 are provided as an optical system for guiding the reflected light to a detector 211.

Figure 6:
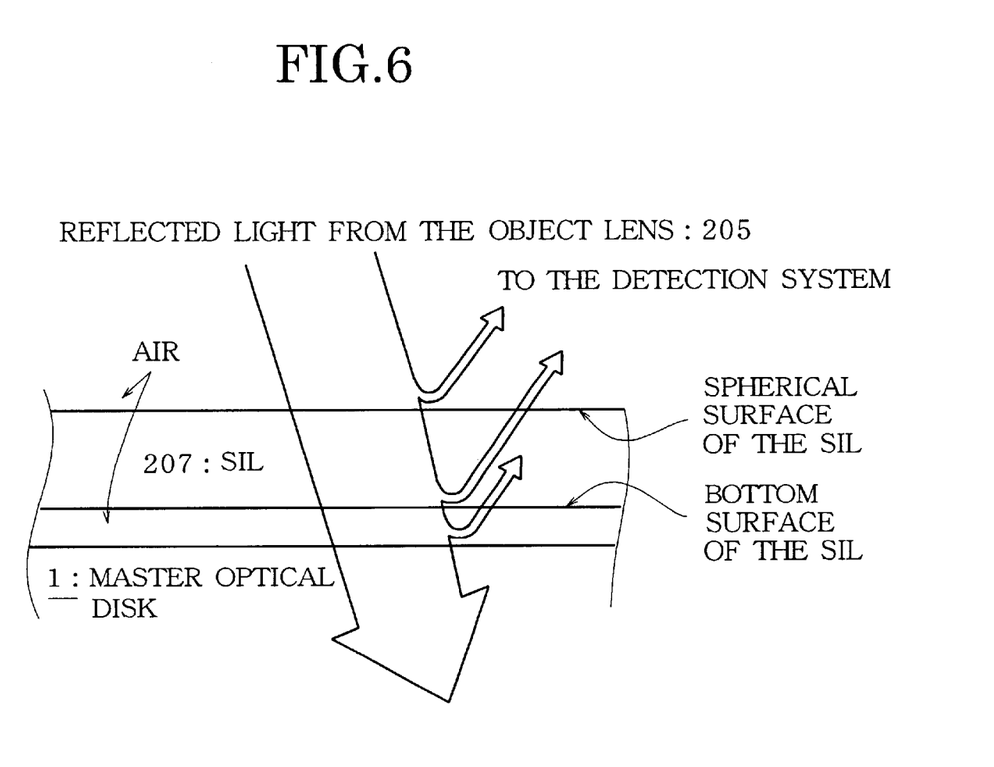
FIG. 6 is a schematic diagram showing a state of reflection of the laser light according to the second embodiment.

FIG. 6 is a schematic diagram showing a state in which the laser light gathered by the object lens 205 is reflected. A portion of the laser light gathered by the object lens 205 is firstly reflected at the spherical surface of the SIL 207. The laser light which passed through the spherical surface of the SIL 207 is radiated onto the master optical disc 1, after a portion being reflected at the bottom surface of the SIL 207, and exposes the photoresist. A portion of the laser light is also reflected at the surface of the master optical disc 1.

In the optical head 7, the three types of reflected light, namely those from the spherical surface of the SIL 207, the bottom surface of the SIL 207, and the master optical disc 1, have approximately the same amount of light. Therefore, it is necessary to separate, from the three types of reflected light, the reflected light from the spherical surface of the SIL 207 in order to perform focus control of the object lens to be positioned so as to gather the laser light onto the spherical surface of the SIL 207. In other words, it becomes essential that only the reflected light from the spherical surface of the SIL 207 is received by the detector 211 in this case.

For the above purpose, a separation optical system including a pinhole is used in the second embodiment. The above-mentioned three types of reflected light pass through the object lens 205 and the quarter wavelength board 204 again, as indicated by the dotted line in FIG. 5, and the light paths are changed by the polarized light beam splitter 203.

Of the reflected light having entered the separation lens 212, only the one from the spherical surface of the SIL 207 passes through the pinhole 213. Then the reflected light from the spherical surface of the SIL 207 which passed through the pinhole 213 is converged onto the detector 211 via the light gathering lens 214. The output of the detector 211 is outputted as the focus error signal SFE to the above-mentioned amplifier 4.

Figure 7:
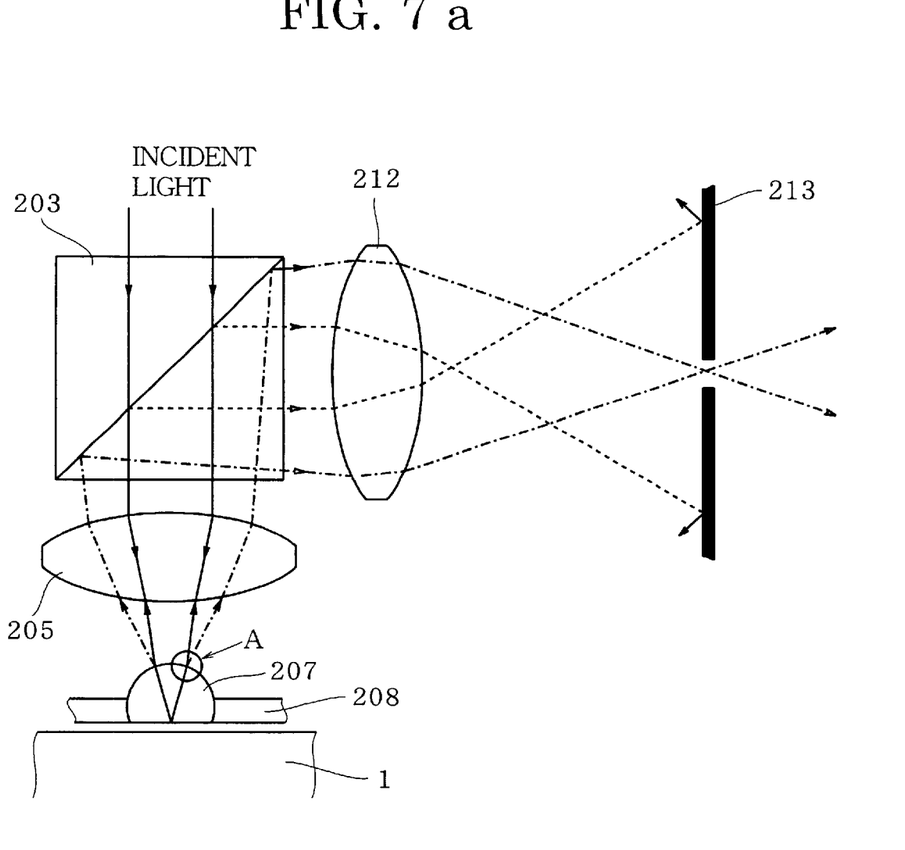
FIGS. 7a and 7b are diagrams showing a state of separation of the reflected light according to the second embodiment.

FIGS. 7(a) and 7(b) show a state of the reflected light being separated, wherein FIG. 7(a) shows the light path of the reflected light from the spherical surface of the SL 207, and FIG. 7(b) is an enlarged diagram of a portion indicated by an arrow A in FIG. 7 (a). Here, common reference numerals with those in FIG. 5 are used.

In FIG. 7, the incident light from the laser light source 201 (not shown), having passed through the polarized light beam splitter 203, passes through the quarter wave length board 204 (not shown) and enters the object lens 205. The incident light having entered the object lens 205 is gathered onto the spherical surface of the SIL 207, further converged by the SIL 207, and radiated onto the master optical disc 1. Here, the light path of the incident light is indicated by a full line in FIG. 7.

The spherical surface reflected light (indicated by the alternate long and short dashed line in the figure) which is the reflected light component from the spherical surface of the SIL 207 becomes divergent light after having passed through the object lens 205, and the light path is changed by the polarized light beam splitter 203 after having passed through the quarter wave length board 204 (not shown).

The spherical surface reflected light, with its light path changed, is gathered by the separation lens 212 so as to pass through the pinhole 213, and received by the detector 211 via the light gathering lens 214 (not shown) after having passed through the pinhole 213.

On the other hand, the bottom surface reflected light (indicated by the dotted line in the figure and including the reflected light from the master optical disc 1) which is the reflected light from the bottom surface of the SIL 207 passes through the object lens 205 tracking the same light path as with the incident light, aligns into parallel light, and the light path is changed by the polarized light beam splitter 203 after having passed through the quarter wave length board 204 (not shown). The bottom surface reflected light, being parallel, is gathered by the separation lens 212 at a point before the spherical surface reflected light and blocked by the pinhole 213.

Thus, the separation lens 212 and the pinhole 213 are disposed so that the detector 211 receives only the reflected light from the spherical surface of the SIL 207, in other words, only the spherical surface reflected light passes through the pinhole 213.

Therefore, in the second embodiment, only the reflected light from the spherical surface of the SIL 207 can be separated from the types of reflected light such as those from the spherical surface of the SIL 207, the bottom surface of the SIL 207, and the master optical disc 1. Because the focus error signal SFE is generated according to the reflected light from the spherical surface of the SIL 207, focus control to keep the distance between the object lens 205 and the SIL 207 along the optical axis constant can be performed so that the focus position of the object lens 205 is correctly set on the spherical surface of the SIL 207 In the case with the second embodiment, the amount of the reflected light from the spherical surface of the SIL 207 receivable by the detector 211 is less than that in the first embodiment, which can be solved by using a higher sensitive detector.

In FIG. 7(a), it is also possible to focus control the object lens 205 to be positioned so as to gather the laser light onto the bottom surface of the SIL 207 by moving the pinhole 213 to the side of the separate lens 212, and letting the reflected light from the bottom surface of the SIL 207 pass through the pinhole 213.

Furthermore, the amount of the reflected light from the spherical surface of the SIL 207 can be increased by combining the first embodiment with the second embodiment, in other words, by disposing the reflective membrane or layer 209 described in the first embodiment on the spherical surface of the SIL 207, in the optical head 7 shown in FIG. 5.

According to the first and second embodiments of the present invention, it becomes possible to adjust the distance between the object lens and the SIL to be constant so that a minute spot can be stably formed.

While the presently preferred embodiments of the present invention have been shown and described, it is to be understood that these disclosures are for the purpose of illustration and that various changes and modifications may be made without departing from the scope of the invention as set forth in appended claims.

What is claimed is:

1. An optical head apparatus comprising:
    an optical head having;
        an object lens for converging light radiated on a recording surface of a recording media,
        a solid immersion lens for further converging the light having been converged by said object lens, and
        drive means for driving said object lens along an optical axis thereof; and
        control means for controlling said drive means so that the distance between said object lens and said solid immersion lens along the optical axis can be kept constant, according to reflected light from said solid immersion lens.

2. The optical head apparatus according to claim 1, wherein said solid immersion lens is mounted on a floating slider to keep the distance between said recording media and said solid immersion lens constant.

3. The optical head apparatus according to claim 2, wherein the distance between said recording media and said solid immersion lens is approximately 50 to 100 nm at the time of recording.

4. The optical head apparatus according to claims 1, further comprising means for separating and receiving reflected light from either spherical surface or bottom surface of said solid immersion lens, wherein said control means controls said drive means according to output derived from the light received by said means for separating and receiving reflected light.

5. The optical head apparatus according to claim 4, wherein said means for separating and receiving reflected light includes a pinhole.

6. The optical head apparatus according to any one of claims 1 to 5, wherein a reflective membrane is disposed on the surface of said solid immersion lens for reflecting the light having been converged by said object lens so that the amount of the reflected light from said solid immersion lens can be increased.

7. The optical head apparatus according to any one of claims 1 to 5, wherein a reflective layer is disposed on the surface of said solid immersion lens for reflecting the light having been converged by said object lens so that the amount of the reflected light from said solid immersion lens can be increased.

* * * * *